(12) United States Patent
Bryan et al.

(10) Patent No.: US 12,529,915 B2
(45) Date of Patent: Jan. 20, 2026

(54) EARBUDS COUPLED TO SMART GLASSES

(71) Applicant: Google LLC, Mountain View, CA (US)

(72) Inventors: Kathleen Alexandra Bryan, Mountain View, CA (US); Shiblee Hasan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 294 days.

(21) Appl. No.: 18/308,488

(22) Filed: Apr. 27, 2023

(65) Prior Publication Data

US 2024/0361614 A1    Oct. 31, 2024

(51) Int. Cl.
*G02C 11/00* (2006.01)
*G02B 27/01* (2006.01)
*H04R 1/10* (2006.01)

(52) U.S. Cl.
CPC .......... *G02C 11/10* (2013.01); *G02B 27/0176* (2013.01); *H04R 1/1016* (2013.01); *H04R 1/1025* (2013.01); *G02B 2027/0178* (2013.01); *G02C 2200/02* (2013.01); *H04R 2420/07* (2013.01); *H04R 2420/09* (2013.01); *H04R 2460/07* (2013.01); *H04R 2460/13* (2013.01)

(58) Field of Classification Search
None
See application file for complete search history.

(56) References Cited

U.S. PATENT DOCUMENTS

| | | |
|---|---|---|
| 2011/0170054 A1 | 7/2011 | Jackson et al. |
| 2016/0370606 A1 | 12/2016 | Huynh |
| 2019/0052951 A1 * | 2/2019 | Kofman ............... H04R 1/1041 |
| 2019/0250411 A1 * | 8/2019 | Haddick ............ G02B 27/0176 |
| 2020/0064654 A1 * | 2/2020 | De La Fuente ........ G02C 11/10 |
| 2020/0218093 A1 | 7/2020 | Blum et al. |
| 2022/0231523 A1 | 7/2022 | Bristol et al. |
| 2023/0205266 A1 * | 6/2023 | Patton .................... H04R 1/028 345/7 |

\* cited by examiner

*Primary Examiner* — Fan S Tsang
(74) *Attorney, Agent, or Firm* — Brake Hughes Bellermann LLP

(57) ABSTRACT

A method includes removably attaching an earbud to a pair of glasses worn by a person. The pair of glasses includes a first speaker configured to deliver sound externally through air or through bone conduction to an ear of the person. The earbud includes a second speaker configured to deliver sound into an ear canal of the person when the earbud is placed in the ear canal. The method further includes establishing a wireless connection between the pair of glasses and the earbud, and detecting a position of the earbud relative to the pair of glasses. The method further includes, when the earbud is detached from the pair of glasses, deactivating the first speaker in the pair of glasses, and activating the second speaker after the earbud is detached from the pair of glasses.

21 Claims, 8 Drawing Sheets

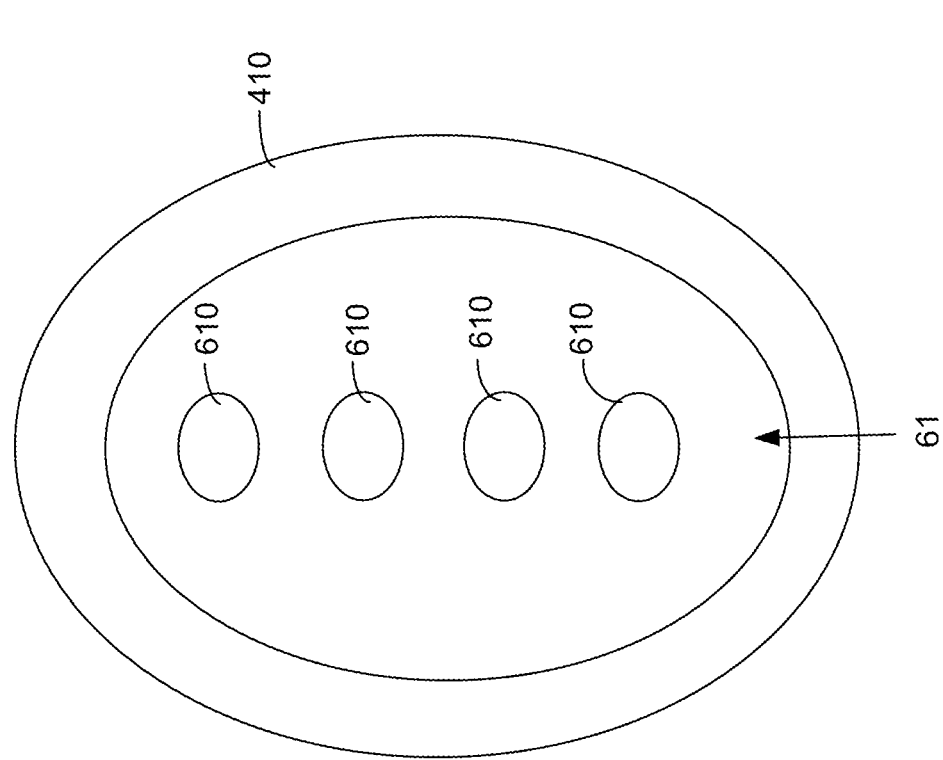

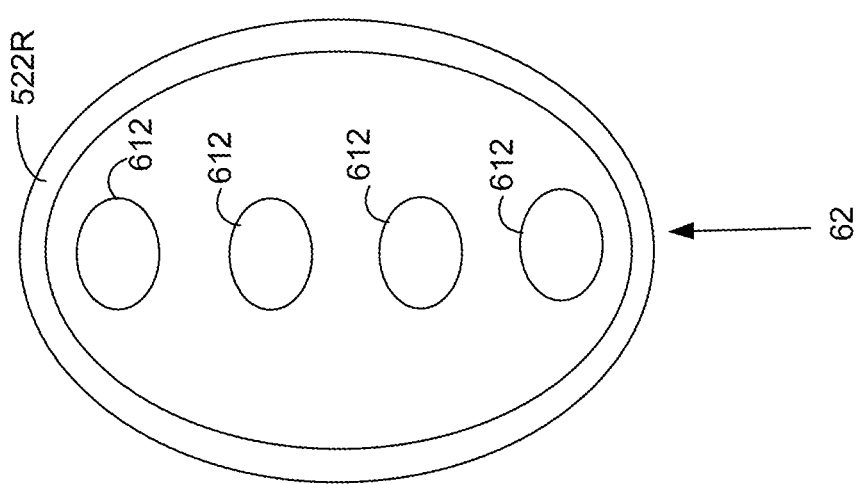

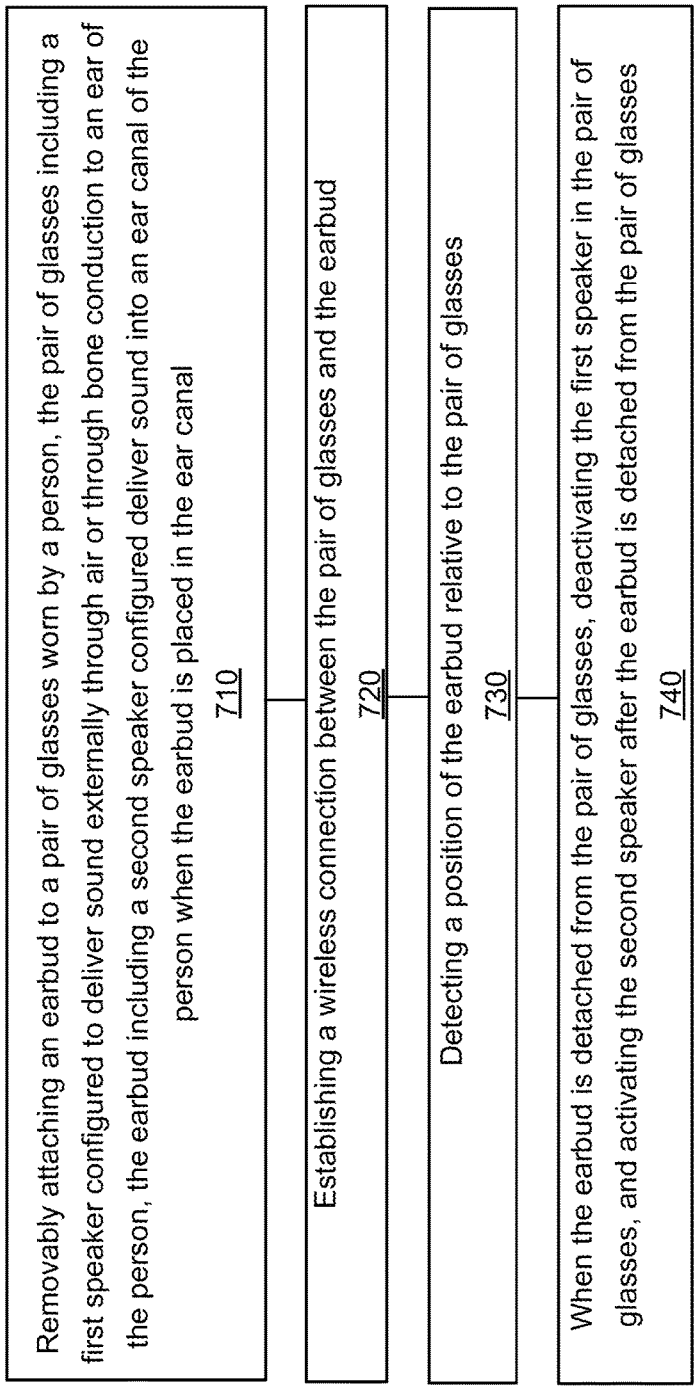

EARBUDS COUPLED TO SMART GLASSES

BACKGROUND

Eyewear (i.e., a pair of glasses, also known as glasses, eyeglasses or spectacles) can be vision aids, consisting of glass or hard plastic lenses mounted in a frame that holds them in front of a person's eyes, typically utilizing a nose bridge over the nose, and legs (known as temples or temple pieces) that rest over the ears. In general, eyewear may include prescription glasses, reading spectacles, fashion eyewear (tinted and clear), sunglasses, ski and safety goggles, head-mounted displays, and more.

Smart glasses are eyewear with built-in computers that add information and functionalities to what the wearer sees or hears from the real world. The information can be displayed on the lenses or projected before the eyes, or delivered to the wearer's ears in audio form through acoustic transducers (e.g., speakers) that may be included, for example, in the temples of the smart glasses.

Consideration is now being given to systems and methods for improving the quality of the sound or audio delivered by the smart glasses to a person's ears.

SUMMARY

In a general aspect, an eyewear includes a frame. The frame has at least one temple with a first end and a second end. The first end is connected to the frame. The eyewear further includes a first speaker disposed in the at least one temple. The first speaker is configured to deliver sound externally through air or through bone conduction to an ear of a person wearing the eyewear. Further, an earbud is removably attached to the second end of the at least one temple. A second speaker is disposed in the earbud and is configured to deliver sound into an ear canal of the person in which the earbud is placed. The eyewear further includes or is coupled to a controller configured to deactivate the first speaker disposed in the at least one temple and activate the second speaker after the earbud is detached from the second end of the at least one temple.

In a general aspect, a method includes removably attaching an earbud to a pair of glasses worn by a person. The pair of glasses includes a first speaker configured to deliver sound externally through air or through bone conduction to an ear of the person. The earbud includes a second speaker configured to deliver sound into an ear canal of the person when the earbud is placed in the ear canal. The method further includes establishing a wireless connection between the pair of glasses and the earbud, and detecting a position of the earbud relative to the pair of glasses. The method further includes, when the earbud is detached from the pair of glasses, deactivating the first speaker in the pair of glasses, and activating the second speaker after the earbud is detached from the pair of glasses.

BRIEF DESCRIPTION OF THE DRAWINGS

FIG. 6A is a cross-sectional view of a charging interface on an earbud.

FIG. 6B is a cross-sectional view of a charging interface on a temple tip.

FIG. 7 illustrates a method for playing an audio portion of an augmented reality presentation on speakers associated with a pair of glasses.

DETAILED DESCRIPTION

This disclosure describes an earbud accessory for a pair of smart glasses (hereinafter "smart glasses"). The earbud is wirelessly connected to the smart glasses to receive audio signals from the smart glasses. When the earbud is placed in an ear of a person, a speaker (e.g., an acoustic transducer) in the earbud can deliver sound received wirelessly (e.g., over a near field wireless connection) from the smart glasses directly into an ear canal of the person. A quality of sound delivered by the earbud directly into the ear canal, as perceived by the person, can be better than a quality of sound that may be delivered, for example, by open air conduction or bone conduction from speakers that may be built in the temples of the smart glasses.

Figure 1:
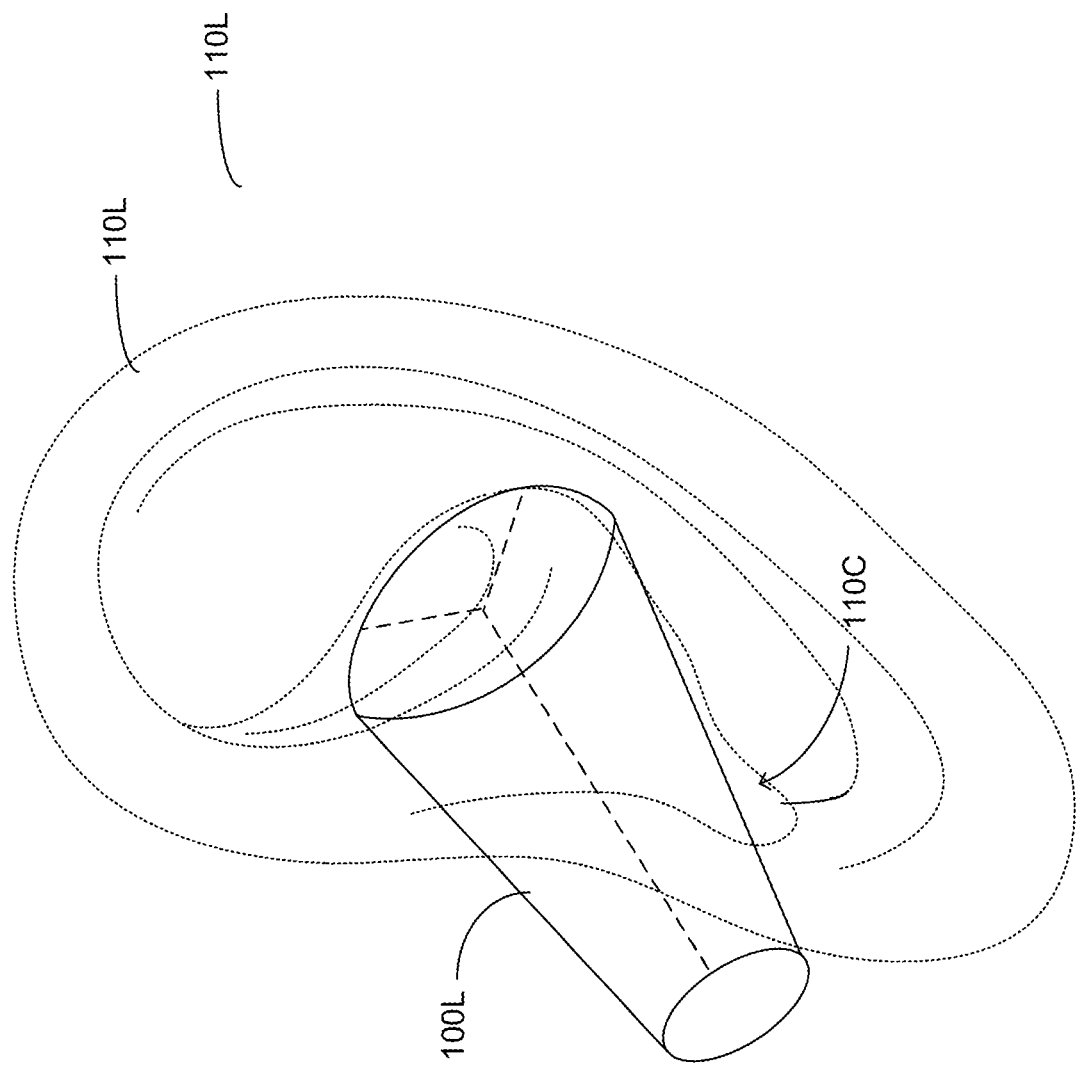
FIG. 1 is a schematic illustrating a mockup of an earbud.

FIG. 1 is a schematic illustrating a mockup of an earbud (e.g., left earbud 100L). The figure shows left earbud 100L placed in an ear canal (e.g., ear canal 110C) a person's left ear (e.g., left ear 110L). A similar earbud (e.g., right earbud 100R, FIG. 2) may be configured to be placed in an ear canal in the person's other ear (e.g., right ear 110R).

The earbuds (e.g., left earbud 100L, right earbud 100R) may be configured as portable accessories that when not in use (i.e., placed in the person's ears) can be removably attached to the smart glasses (e.g., to the tips of the temples of the smart glasses).

Figure 2:
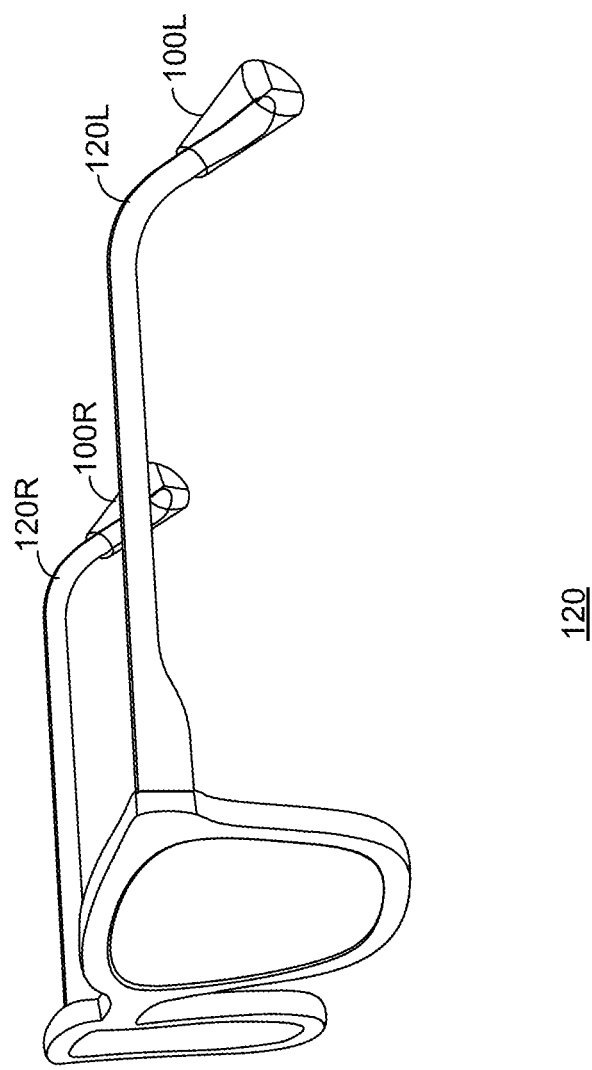
FIG. 2 illustrate an example smart glasses with a pair of earbuds removably attached to a pair of temple tips of the smart glasses.
Figure 3:
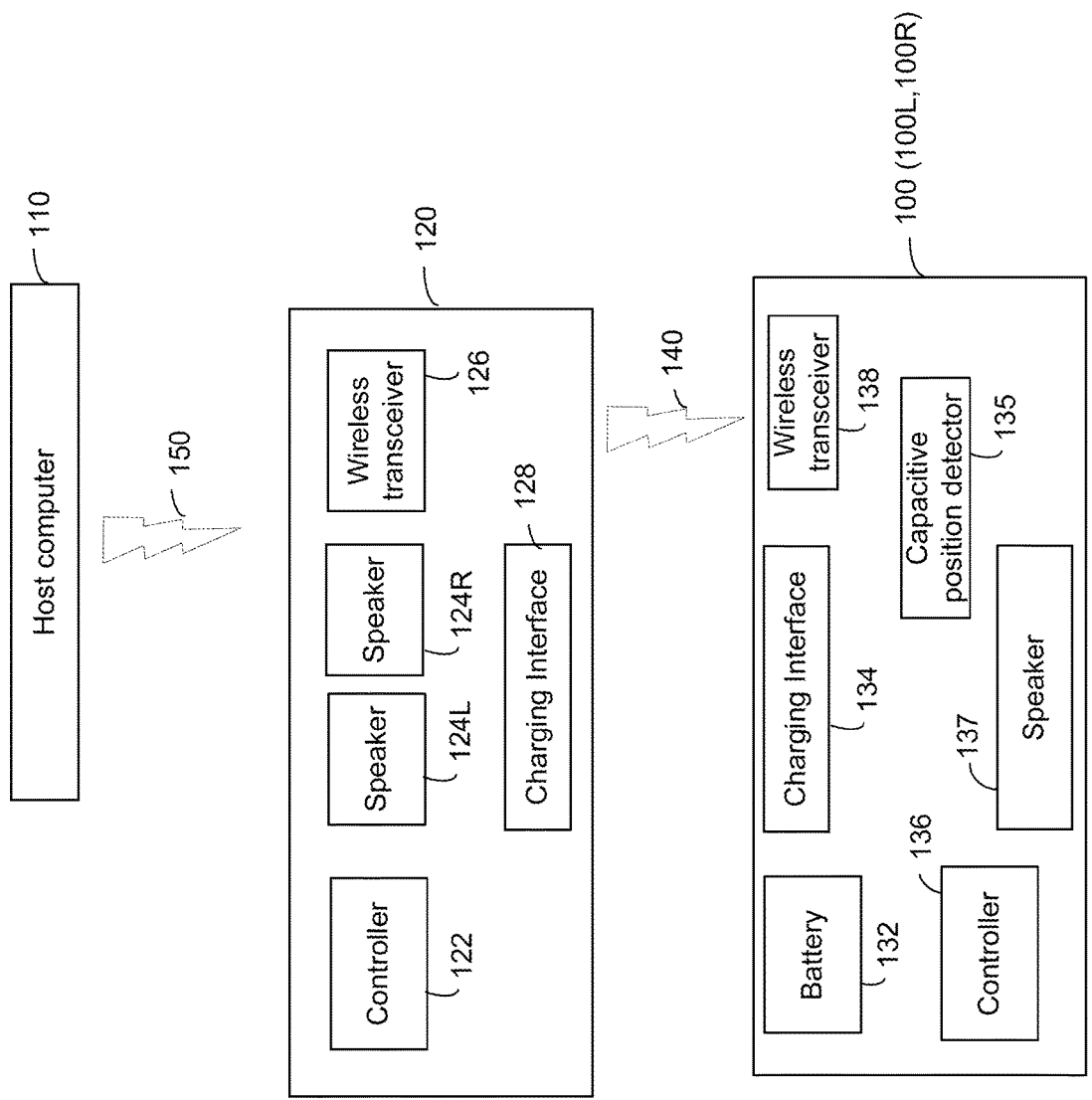
FIG. 3 is a block diagram of a system coupling an earbud smart glasses for delivering sound to a person's ears.
Figure 4:
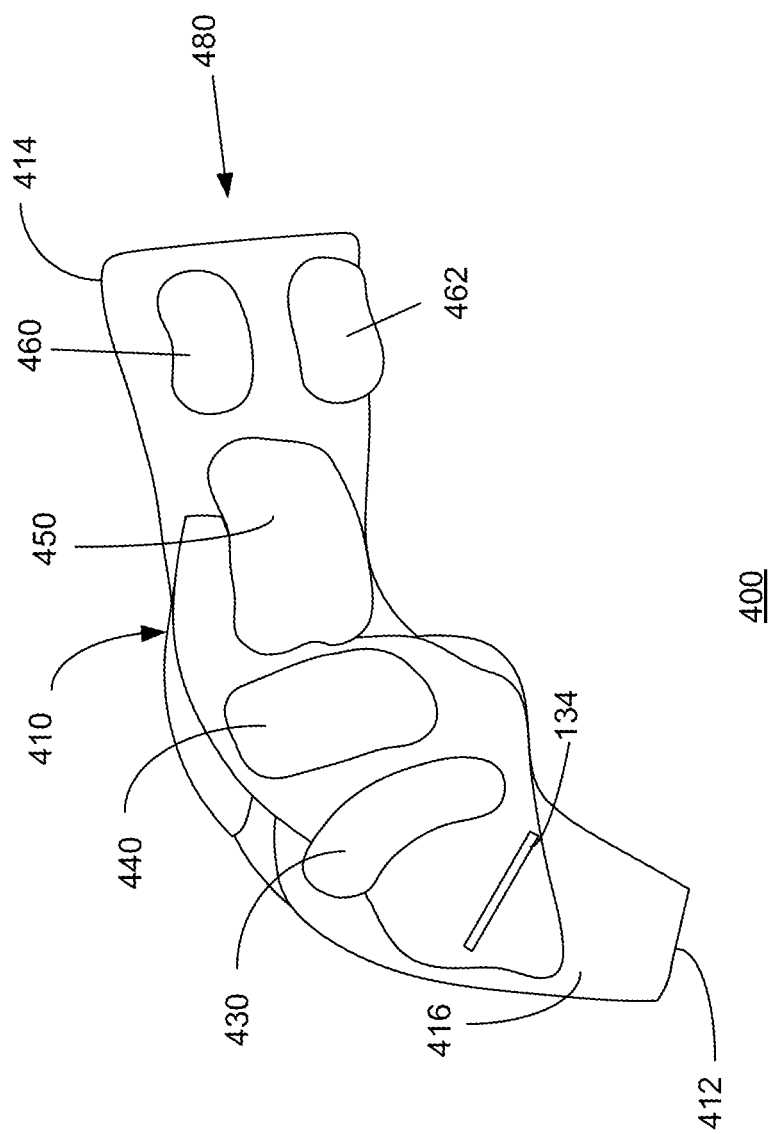
FIG. 4 illustrates a side perspective view of an example earbud that may be used with smart glasses.

FIG. 2 shows, for example, an example smart glasses 120 with the earbuds (e.g., left earbud 100L, right earbud 100R) removably attached to temple tip 120L and temple tip 120R, respectively, of the smart glasses. In some instances, the earbuds may be attached to the temple tips magnetically (FIGS. 3 and 4). In some instances, the earbuds may be attached to the temple tips using electromechanical connectors or using mechanical mechanisms (e.g., press-fit pins, etc.) (not shown).

In some instances, the earbuds may be attached to the ends of the tips of the smart glasses through electromechanical interfaces (e.g., electromechanical connectors) to allow charging or recharging of batteries in the earbuds by a power supply (e.g., a battery) in the frame or temples of the smart glasses. In some instances, the earbuds may remain attached to the temple tips even when the earbuds do not need battery charging or recharging. The earbuds may remain attached to the temple tips for convenience in portability (e.g., carrying the earbuds along with the smart glasses worn by the person instead of carrying the earbuds in a separate package or container). In some instances, the earbuds may be charged or recharged directly by a standalone battery charger independent of the smart glasses.

The earbuds (e.g., left earbud 100L, right earbud 100R) may be communicatively connected over short distances to the smart glasses by near field or short-range wireless technology (e.g., Bluetooth wireless technology). The earbuds may be activated and deliver sound into the person's ear canal even when the smart glasses are not directly resting on the person's face (e.g., are instead raised to rest on the forehead or on the top of the head) or even when the smart glasses are completely removed the person's face and placed nearby.

FIG. 3 is a block diagram of a system 200 coupling an earbud 100 to smart glasses (e.g., smart glasses 120) for delivering sound to a person's ears. In some implementations, system 200 may include two earbuds 100 with a first earbud (e.g., left earbud 100L) for the left ear of the person and a second earbud (e.g., right earbud 100R) for the right ear of the person.

In example implementations, earbud 100 may include at least a battery 132, a computing device (e.g., controller 136) (including a processor and memory), a wireless transceiver 138, an acoustic transducer (e.g., speaker 137), and a position sensor (e.g., capacitive position detector 135). Battery 132 may supply power to operate the other components (e.g., controller 136, wireless transceiver 138, speaker 124, capacitive position detector 135, etc.) of the earbud. Earbud 100 may have an electromechanical connector (e.g., charging interface 128) which can be coupled to a corresponding interface on a battery charger (e.g., smart glasses 120) to charge or recharge battery 132. Capacitive position detector 135 may detect a position of the earbud (e.g., whether the earbud is placed in an ear canal, or whether the earbud is attached to a battery charger, etc.). Controller 136 may activate speaker 137 to deliver sound when the earbud is positioned in an ear canal of a person. Speaker 137 may deliver sound according to signals (e.g., Bluetooth wireless 140) received over wireless transceiver 138, for example, from smart glasses 120.

Smart glasses 120 may, for example, include a frame holding lenses, and temples that rest on the person's ears to hold the lenses in front of the person's eyes (FIG. 2). Smart glasses 120 may be any type of glasses (e.g., prescription glasses, reading spectacles, fashion eyewear, sunglasses, ski goggles, safety goggles, head-mounted optical displays, augmented reality (AR) glasses, virtual reality (VR) glasses, or audio glasses, etc.).

In example implementations, smart glasses 120 may include at least a computing device (e.g., controller 122), a wireless transceiver 126, and one or more acoustic transducers (e.g., speaker 124L, speaker 124R, collectively speaker 124). Speaker 124 may be built in the frame or a temple of smart glasses 120 such that sound generated by the speaker is transmitted through the air or via bone conduction to an ear of the person wearing the smart glasses. In some implementations, smart glasses 120 may include at least a first speaker (e.g., speaker 124L) disposed in a left temple for the left ear of the person and a second speaker (e.g., speaker 124R) disposed in a right temple for the right ear of the person.

Smart glasses 120 may be communicatively coupled (e.g., wirelessly over the Internet 150 or other wireless networks) with an external host computer 110. Smart glasses 120 may be configured to receive, for example, augmented reality presentations from external host computer 110 through transceiver 126 for display to the person wearing smart glasses 120 (e.g., in addition to what the person sees through the lenses of the smart glasses). An augmented reality presentation may include a visible portion (e.g., a video portion) and or an audio portion. Controller 122 in the smart glasses may be configured to present the audio portion of the augmented reality presentation through speakers (e.g., speaker 124) in the smart glasses and or the speakers (e.g., speaker 137) in the earbuds (e.g., left earbud 100L) for the left ear of the person and a second earbud (e.g., right earbud 100R) for the right ear of the person.

In example implementations, smart glasses 120 may be configured to detect the placement of an earbud (e.g., left earbud 100L or right earbud 100R) in an ear canal (left car canal or right ear canal) of the person, one by one. When an earbud placed in the left or right car canal of the person is detected, smart glasses 120 may accordingly deactivate the corresponding speaker in the left temple (speaker 124L) or in the right temple (speaker 124R) of the smart glasses and activate the speaker (e.g., speaker 137) in the earbud placed in the left or right ear canal of the person.

In some example implementations, smart glasses 120 may be configured to detect when an earbud (e.g., left earbud 100L or right earbud 100R) is detached from the smart glasses. In response, smart glasses 120 may deactivate the speaker (e.g., speaker 124L in the left temple or speaker 124R in the right temple) in the corresponding temple of the smart glasses and activate the speaker (e.g., speaker 137) in the detached earbud (as soon as the earbud is detached and even before the detached earbud is placed in the left or right ear canal of the person).

There may be at least four possible scenarios or states in the use or deployment of the two earbuds (e.g., left earbud 100L and right earbud 100R) and the speakers (e.g., speaker 124L and speaker 124R) associated with smart glasses 120, as follows.

(1) State 1: Neither earbud is placed in an ear canal, both speakers (speaker 124L and speaker 124R) in the temples of the smart glasses are active, and both speakers (e.g., speaker 137) in the earbuds are deactivated;

(2) State 2: Left earbud 100L is placed in an ear canal, speaker 137 in the left earbud and speaker 124R in the right temple of the smart glasses are active, and speaker 137 in the right earbud and speaker 124L in the left temple of the smart glasses are deactivated;

(3) State 3: Right earbud 100R is placed in an ear canal, speaker 137 in the right earbud and speaker 124L in the left temple of the smart glasses are active, and speaker 137 in the left earbud and speaker 124R in the right temple of the smart glasses are deactivated; and (4) State 4: Left earbud 100L and right earbud 100R are placed in respective ear canals, speakers 137 in the left earbud and in the right earbud are active, and the speakers (e.g., speaker 124L and speaker 124R) in the temples of the smart glasses are deactivated.

In example implementations, smart glasses may be configured to adjust the relative sound output of the earbud speakers and temple speakers to provide a uniform and balanced sound experience to the person when transitioning between the foregoing states of deployment of the earbuds.

In some other example implementations, the earbuds (e.g., left earbud 100L and right earbud 100R) for smart glasses may be made of made up of a variety of materials, such as plastic, aluminum, ceramic and other metal alloys. The ear tips of the earbuds (i.e., portions that are inserted in the ear canals) may be made, for example, of silicone rubber.

FIG. 4 shows a side perspective view of an example earbud 400 that may be used with smart glasses (e.g., smart glasses 120, etc.).

Earbud 400 may include a body 410 (e.g., a partially hollow body) with a first end 412 and a second end 414. Body 410 may include speaker membrane 430, an electronics board (e.g., controller 440), and a battery 450. First end 412 may extend into an ear tip (e.g., ear tip 416) that can be fitted in an ear canal of a person. Second end 414 may include an opening 480 that extends into body 410 up to an electromechanical connector (e.g., charging interface 134)

that is configured to be connected to a battery charger. Opening 480 may be configured to receive an end of temple tip of a smart glasses (e.g., smart glasses 500, FIG. 5) to attach earbud 400 to the smart glasses. Strips of magnetic material (e.g., magnet 460 and magnet 462 may be disposed on body 410 (e.g., near second end 414). Magnet 460 and magnet 462 may help magnetically attach earbud 400 to the temple tip of the smart glasses.

Figure 5:
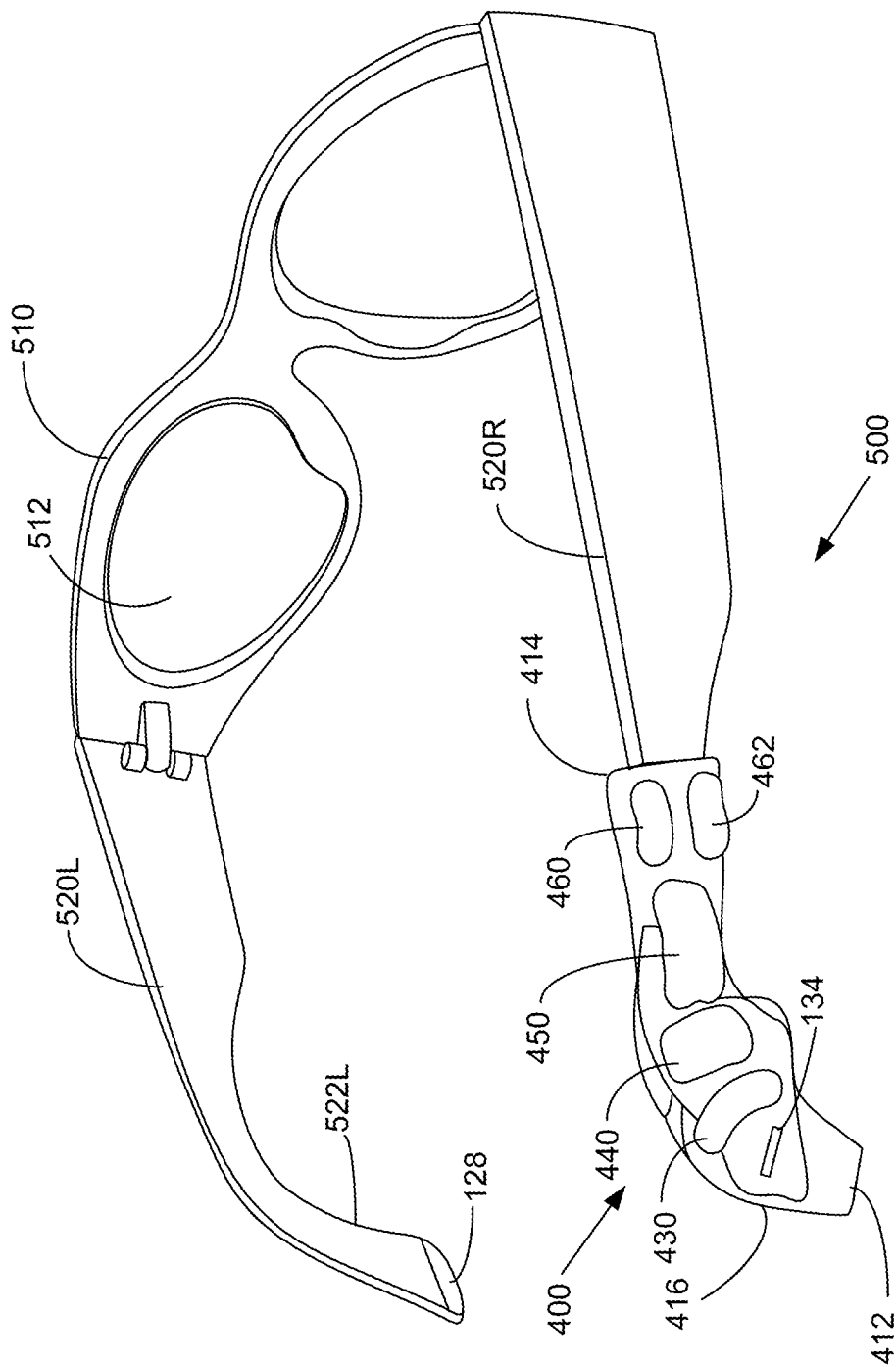
FIG. 5 illustrates an example smart glasses with an earbud attached to an end of a temple of the smart glasses.

FIG. 5 shows, for example, an example smart glasses 500 with an earbud 400 attached to an end of a temple of the smart glasses. Smart glasses 500 may include a frame 510 holding lenses 512. Temples (e.g., temple 520L and temple 520R) may be attached (e.g., by hinges) to a left end and a right end of frame 510. Temple 520L and temple 520R may be positioned over the left ear and the right ear, respectively, of a person wearing smart glasses 500 to hold the lenses (e.g., lenses 512) in front of the person's eyes. Temple 520L and temple 520R may include respective temple tips (e.g., temple tip 522L and 522R) that curve around the person's ears, (e.g., to prevent the smart glasses from sliding forward when the person bends their head forward). Although not explicitly shown in FIG. 5, the temples (e.g., temple 520L and temple 520R) may include the electronics and speakers (e.g., controller 122, speaker 124L and speaker 124R, FIG. 3) needed to display at least audio signals in addition to what the person sees through the lenses.

For visual clarity, FIG. 5 shows only a single earbud attached to smart glasses 500. For example, FIG. 5 shows an earbud (e.g., earbud 400) attached to only a right temple (e.g., to temple tip 522R). It will be understood that a second earbud (the same as, or similar to, earbud 400) also may be attached to the left temple (e.g., to temple tip 522L). The ends of each of the temple tips (e.g., temple tip 522L and 522R) may include an electromechanical connector (e.g., charging interface 128, FIG. 2) that can be coupled to a corresponding electromechanical connector (e.g., charging interface 134, FIG. 2, FIG. 5) in an earbud 400. The electromechanical connector (e.g., charging interface 128, FIG. 2) can be coupled to the corresponding electromechanical connector (e.g., charging interface 134, FIG. 2, FIG. 5) in earbud 400 by inserting the end of the temple tip (e.g., temple tip 522R) into opening 480 of the earbud 400.

In example implementations, charging interface 134 on the earbud and charging interface 128 on the temple tip may include an arrangement of pogo pins and corresponding sockets. FIG. 6A is a cross-sectional view of charging interface 134 on earbud 400 and FIG. 6B is a cross-sectional view of charging interface 128 on a temple tip (e.g., temple tip 522L). As shown in FIG. 6A, charging interface 134 on earbud 400 may include an arrangement 61 of pogo pins 610. As shown in FIG. 6B, charging interface 128 includes an arrangement 62 of sockets 612 that is configured to receive the pogo pins (pogo pins 610) of FIG. 6A to couple or attach earbud 400 to the temple tip (e.g., temple tip 522L).

In example implementations, the earbud includes a first electromechanical connector (e.g., charging interface 134) and the second end of the at least one temple includes a corresponding second electromechanical connector (e.g., charging interface 128). The earbud is attached to the second end of the at least one temple by joining or mating (i.e., coupling) the first electromechanical connector and the corresponding second electromagnetic connector together. In example implementations, the first and the second electromechanical connector may include an arrangement of pins (e.g., pogo pins) and sockets, or may, for example, include an arrangement of mini- or micro-USB connectors.

In example implementations, the smart glasses may charge or recharge a battery in the earbud through the coupled first electromechanical connector and second electromagnetic connector.

FIG. 7 illustrates a method 700 for playing an audio portion of an augmented reality presentation on speakers associated with a pair of glasses.

Method 700 includes removably attaching an earbud to a pair of glasses worn by a person (710). The pair of glasses may include a first speaker configured to deliver sound externally through air or through bone conduction to an ear of the person. The earbud may include a second speaker configured to deliver sound into an ear canal of the person when the earbud is placed in the ear canal.

Method 700 further includes establishing a wireless connection between the pair of glasses and the earbud (720), detecting a position of the earbud relative to the pair of glasses (730), and when the earbud is detached from the pair of glasses, deactivating the first speaker in the pair of glasses, and activating the second speaker after the earbud is detached from the pair of glasses (740).

In method 700, deactivating the first speaker may include activating the second speaker in the earbud.

In method 700, detecting a position of the earbud may include capacitively determining that the earbud is placed in an ear canal of the person, and activating the second speaker may include activating the second speaker in the earbud placed in the ear canal of the person.

Method 700 may further include receiving an augmented reality presentation on the pair of glasses and playing at least an audio portion of the augmented reality presentation over the second speaker in the earbud placed in the ear canal of the person.

In method 700, removably attaching an earbud to a pair of glasses worn by a person includes joining a first electromechanical connector on the earbud to a second electromechanical connector on the pair of glasses, and further charging or recharging a battery in the earbud through the first electromechanical connector on the earbud joined to the second electromechanical connector.

Further, in method 700, establishing a wireless connection between the pair of glasses and the earbud may include establishing a Bluetooth connection.

Several implementations have been described in this specification. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An eyewear comprising:
    a frame including at least one temple having a first end and a second end, the first end connected to the frame;
    a first speaker disposed in the at least one temple, the first speaker configured to deliver sound externally through air or through bone conduction to an ear of a person wearing the eyewear;
    an earbud removably attached to the second end of the at least one temple;
    a second speaker disposed in the earbud, the second speaker configured to deliver sound into an ear canal of the person in which the earbud is placed; and
    a controller configured to deactivate the first speaker disposed in the at least one temple and activate the second speaker in response to determining that the earbud is detached from the second end of the at least one temple.

2. The eyewear of claim 1, wherein the earbud is connected to the controller in the eyewear by a near-field wireless connection.

3. The eyewear of claim 2, wherein the near-field wireless connection is Bluetooth wireless connection.

4. The eyewear of claim 1, wherein the controller is configured to activate the second speaker upon the earbud being detached from the second end of the at least one temple.

5. The eyewear of claim 1, wherein the earbud includes a capacitive position sensor which senses a placing of the earbud in the ear canal of the person.

6. The eyewear of claim 5, wherein the controller is configured to activate the second speaker upon capacitively detecting placement of the earbud in the ear canal of the person.

7. The eyewear of claim 1, wherein the earbud includes magnetic material for magnetically attaching the earbud to the second end of the at least one temple.

8. The eyewear of claim 1, wherein the earbud includes a first electromechanical connector and the second end of the at least one temple includes a second electromechanical connector, and wherein the earbud is attached to the second end of the at least one temple by joining the first electromechanical connector and the second electromechanical connector.

9. The eyewear of claim 8, wherein the first electromechanical connector and the second electromechanical connector include an arrangement of pogo pins and corresponding sockets.

10. The eyewear of claim 8, wherein the earbud includes a battery, and the eyewear is configured to charge or recharge the battery in the earbud through the first electromechanical connector and the second electromechanical connector.

11. The eyewear of claim 1, wherein the at least one temple is a first temple, the earbud is a first earbud, and the frame includes a second temple, and wherein the eyewear further comprises:
    a third speaker disposed in the second temple, the third speaker configured to deliver sound externally through air or through bone conduction to another ear of the person wearing the eyewear;
    a second earbud removably attached to the second temple; and
    a fourth speaker disposed in the second earbud, the fourth speaker configured to deliver sound into an ear canal of the person in which the second earbud is placed, and wherein the controller is configured to deactivate the third speaker disposed in the second temple and activate the fourth speaker after the second earbud is detached from the second temple.

12. The eyewear of claim 11, wherein the eyewear has first state in which the first speaker in the first temple and the third speaker in the second temple are activated, a second state in which the second speaker in the first earbud and the third speaker in the second temple are activated, a third state in which the fourth speaker in the second earbud and the first speaker in the first temple are activated, and a fourth state in which the second speaker in the first earbud and the fourth speaker in the second earbud are activated, and
    wherein the controller is further configured to adjust sound outputs of the first, second, third and fourth speakers to provide a uniform and balanced sound experience to the person wearing the eyewear when transitioning between the first, second, third and fourth states of the eyewear.

13. The eyewear of claim 1 comprising one of prescription glasses, reading spectacles, fashion eyewear, sunglasses, ski goggles, safety goggles, head-mounted optical displays, augmented reality (AR) glasses, virtual reality (VR) glasses, or audio glasses.

14. The eyewear of claim 1, further comprising, a transceiver configured to receive an augmented reality presentation from an external host computer for display to the person wearing the eyewear in addition to what the person sees through the eyewear, and wherein an audio portion of the augmented reality presentation is delivered as sound by the first speaker disposed in the at least one temple and or by the second speaker disposed in the earbud.

15. A method comprising:
    removably attaching an earbud to a pair of glasses worn by a person, the pair of glasses including a first speaker configured to deliver sound externally through air or through bone conduction to an ear of the person, the earbud including a second speaker configured deliver sound into an ear canal of the person when the earbud is placed in the ear canal;
    establishing a wireless connection between the pair of glasses and the earbud;
    detecting a position of the earbud relative to the pair of glasses; and
    when the earbud is detached from the pair of glasses, deactivating the first speaker in the pair of glasses, and activating the second speaker in response to determining that the earbud is detached from the pair of glasses.

16. The method of claim 15, wherein deactivating the first speaker includes activating the second speaker in the earbud.

17. The method of claim 16, wherein detecting the position of the earbud includes capacitively determining that the earbud is placed in the ear canal of the person, and wherein activating the second speaker includes activating the second speaker in the earbud placed in the ear canal of the person.

18. The method of claim 16, further comprising, receiving an augmented reality presentation on the pair of glasses and playing at least an audio portion of the augmented reality presentation over the second speaker in the earbud placed in the ear canal of the person.

19. The method of claim 15, wherein removably attaching the earbud to the pair of glasses worn by the person includes joining a first electromechanical connector on the earbud to a second electromechanical connector on the pair of glasses.

20. The method of claim 19 further comprising: charging or recharging a battery in the earbud through the first electromechanical connector on the earbud joined to the second electromechanical connector.

21. The method of claim 15, wherein establishing the wireless connection between the pair of glasses and the earbud includes establishing a Bluetooth connection.

\* \* \* \* \*